United States Patent [19]
Freeman

[11] 3,946,691
[45] Mar. 30, 1976

[54] AUTOPILOT EMPLOYING IMPROVED HALL-EFFECT DIRECTION SENSOR

[75] Inventor: Robert M. Freeman, Tacoma, Wash.

[73] Assignee: Metal Marine Pilot, Inc., Tacoma, Wash.

[22] Filed: June 23, 1975

[21] Appl. No.: 589,269

Related U.S. Application Data

[60] Continuation of Ser. No. 407,139, Oct. 17, 1973, abandoned, which is a division of Ser. No. 183,791, Sept. 27, 1971, Pat. No. 3,906,641.

[52] U.S. Cl. .......... 114/144 E; 235/150.2; 244/77 E; 318/588; 318/647
[51] Int. Cl.² ...................................... B63H 25/02
[58] Field of Search .......... 33/1 PT, 363 R; 73/1 E, 73/178 R; 114/144 R, 144 A, 144 E; 180/79.1, 79.2; 235/150.2; 244/77 R, 77 E, 50; 307/309; 318/588, 647, 653; 324/45; 340/177 VZ, 187

[56] References Cited
UNITED STATES PATENTS

| | | | |
|---|---|---|---|
| 2,870,979 | 1/1959 | Tribken et al. | 244/77 E X |
| 3,140,436 | 7/1964 | Hatch | 318/588 X |
| 3,199,630 | 8/1965 | Engel et al. | 340/177 VZ |
| 3,280,781 | 10/1966 | Koerner | 114/144 E |
| 3,425,648 | 2/1969 | Wipff et al. | 244/77 E |
| 3,622,898 | 11/1971 | Salmon | 324/45 X |
| 3,657,629 | 4/1972 | Lloyd | 318/647 |
| 3,696,282 | 10/1972 | Hirokawa et al. | 318/588 |

FOREIGN PATENTS OR APPLICATIONS

| | | | |
|---|---|---|---|
| 1,175,606 | 12/1969 | United Kingdom | 33/363 R |
| 1,239,785 | 7/1971 | United Kingdom | 114/144 A |

*Primary Examiner*—Trygve M. Blix
*Assistant Examiner*—Stephen G. Kunin
*Attorney, Agent, or Firm*—Christensen, O'Connor, Garrison & Havelka

[57] ABSTRACT

An improved marine compass employs a Hall-effect device which provides an output signal related to the relative rotation of the compass card therein. When the Hall-effect device is mounted on a course dial whose position with respect to the compass' lubber line indicates a desired course, the output signal may be used as an input to an autopilot system. The system includes a DC constant current supply for the Hall-effect device, and an integrated circuit operational amplifier for amplifying said output signal to provide an angle signal having a usable level. A differentiator including a second IC operational amplifier provides a rate signal from the angle signal. A rudder signal is provided by a rudder position sensor employing a second Hall-effect device and a third IC operational amplifier. The angle and rate signals are combined and supplied with the rudder signal to a variable-threshold differential amplifier which in turn provides a control signal to a steering servomotor to modify the rudder position so as to return the vessel to its desired course. To allow high rates of rudder positioning without overshoot, a null damper circuit varies the threshold of the differential amplifier to pulse modulate the control signal at small values thereof. By replacing the marine compass with a manual control employing a Hall-effect device, the system operates as a remote steering system.

26 Claims, 6 Drawing Figures

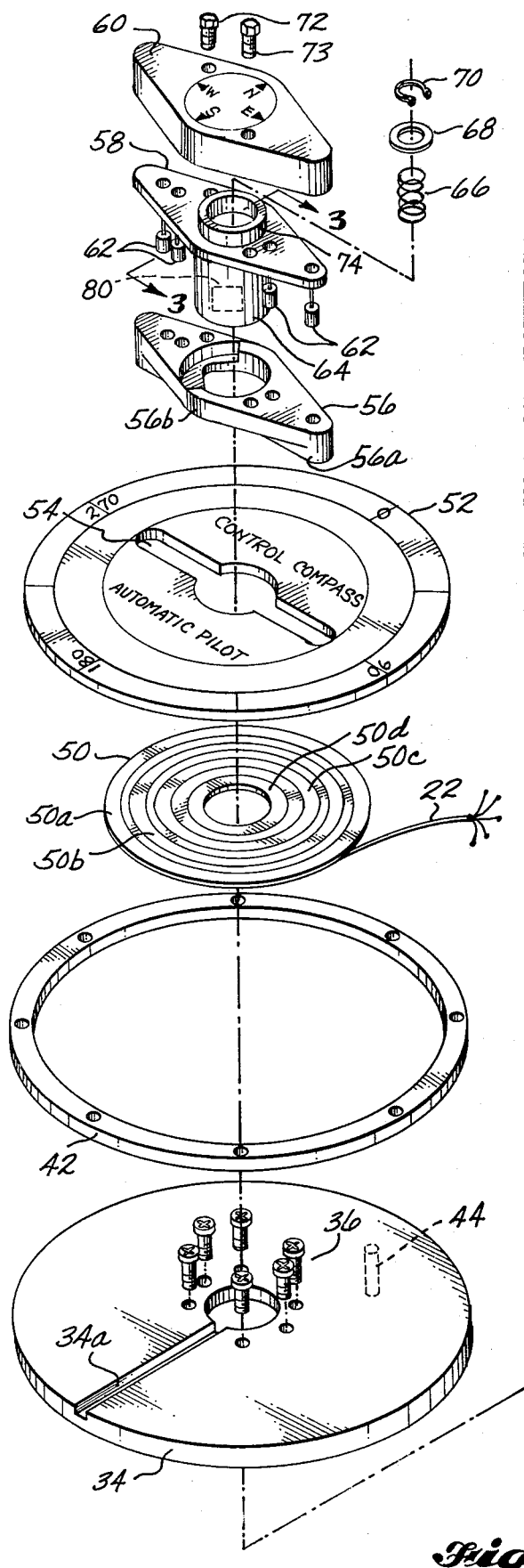
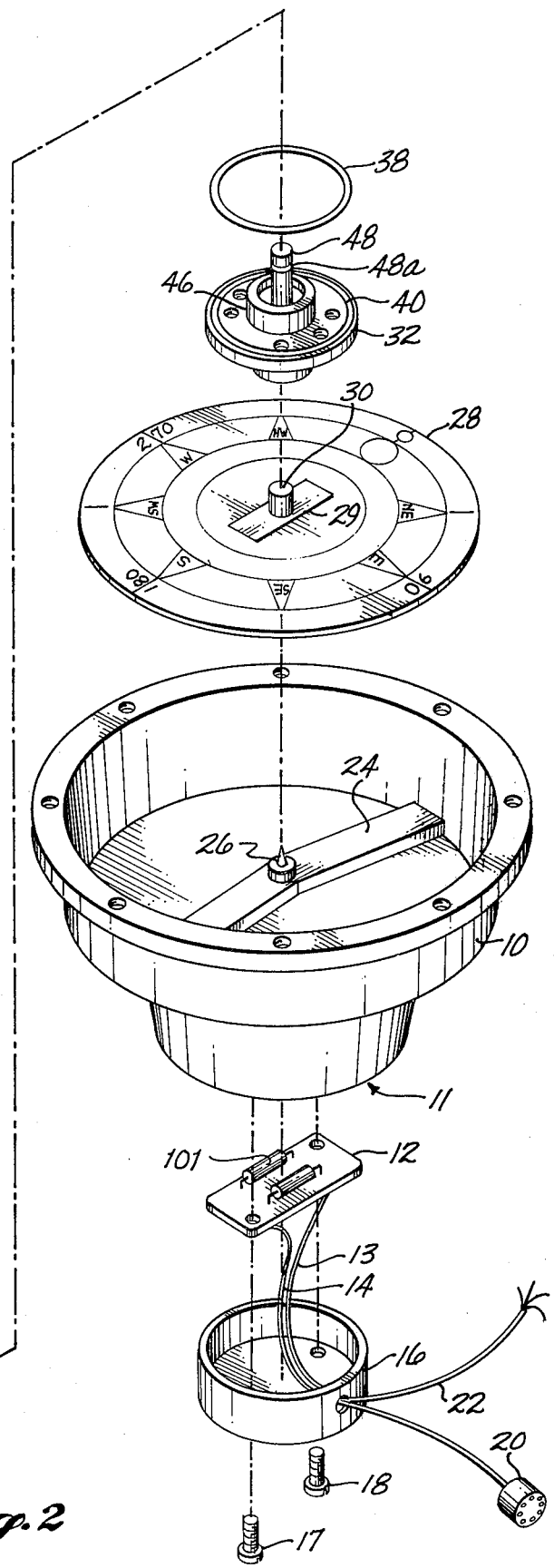
Fig. 2

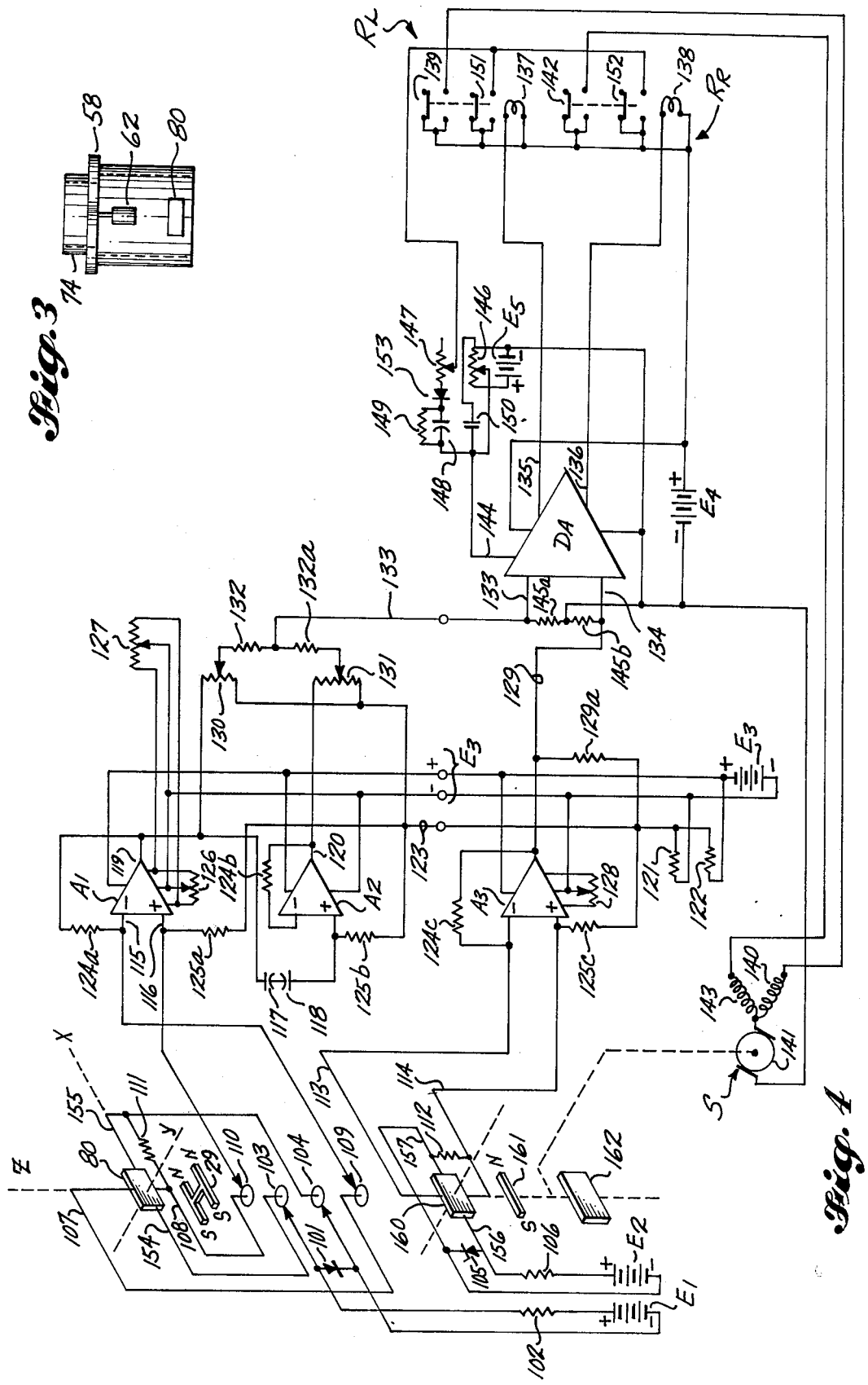

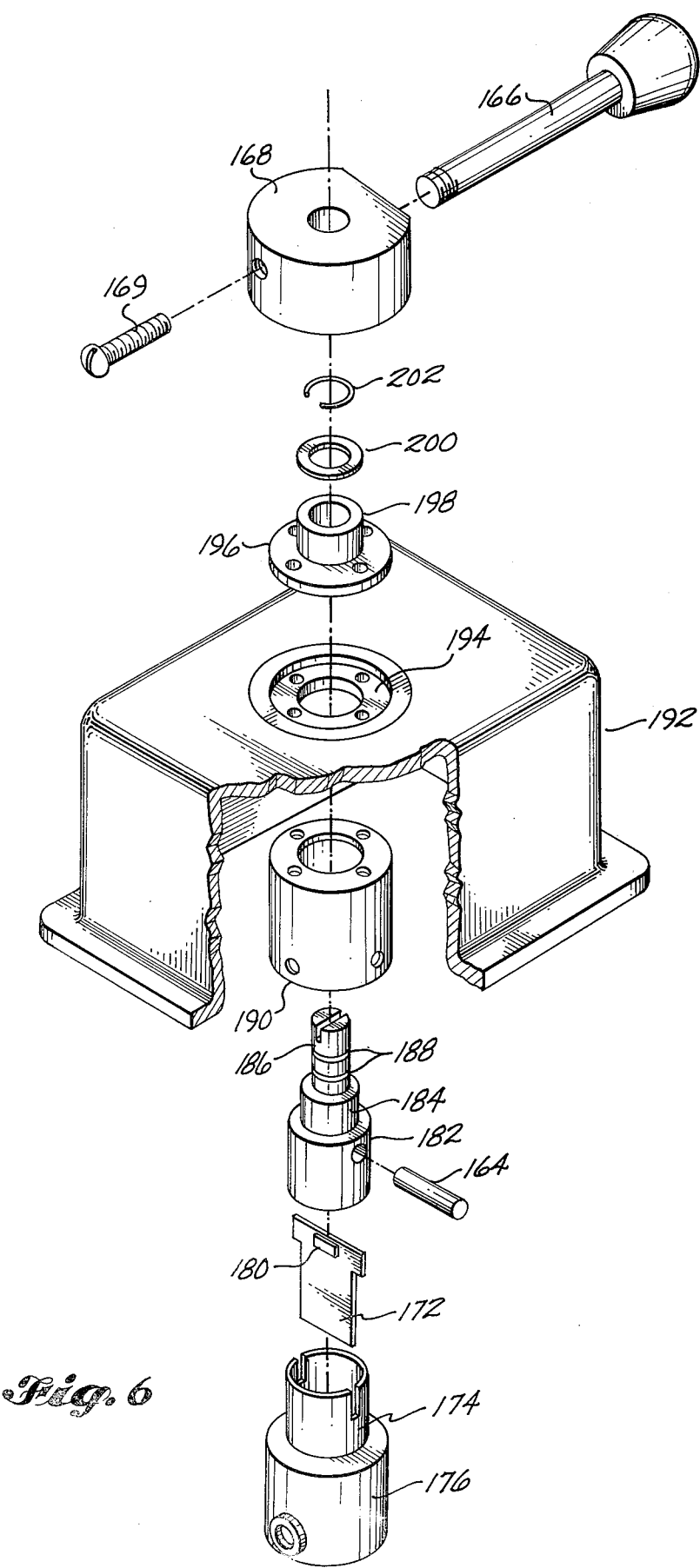

AUTOPILOT EMPLOYING IMPROVED HALL-EFFECT DIRECTION SENSOR

This is a continuation of application Ser. No. 407,139 filed Oct. 17, 1973, now abandoned, which is a divisional of application Ser. No. 183,791, filed Sept. 27, 1971, now U.S. Pat. No. 3,906,641.

BACKGROUND OF THE INVENTION

This invention generally relates to autopilot systems for marine and other vessels, and, more particularly, to systems employing an improved sensor using a Hall-effect device.

There have been many types of sensors which have been included in systems providing detection of an angular deviation of a navigable body from a predetermined direction and automatic redirection of navigable body to the predetermined direction. These systems, generally known as autopilots, have been used extensively in both airborne and marine navigation. Airborne systems have used a gyrocompass as an angular deviation sensor. This approach has proved to be too expensive for most marine applications. Consequently, marine autopilot systems have included a variety of sensors. A first type includes those having electrical contacts disposed on a compass card, whose angular position is responsive to the earth's magnetic field, and on a rotatable course dial affixed to the compass binnacle for presetting a desired course. In a second type, angular deviation from a desired course is sensed by inductors placed on the compass card and on the course dial. In a third type, angular deviation is proportional to capacitive interaction between capacitive elements. A fourth type includes a permanent magnet located on the compass card, which interacts with an inductive device on the course dial. A fifth type indludes a light source and one or more photoelectric cells. The compass card acts as a shutter, or modulates the light beam to indicate angular deviation. A sixth type comprises flux gates, which generally include a pickup element of highly permeable magnetic material positioned adjacent the compass card.

These sensors are subject to certain errors which limit their usefulness in many regards. All of the prior sensors are sensitive to RF interference from radiotelephone units. The magnitude of this interference is increased with those sensors using alternating current signals. Those systems employing sensors of the first type, that is, the direct contact sensor, suffer from the disadvantage of physical restraint upon the compass card. Although the friction forces have been minimized by use of the "cat-whisker" approach, the sensors are still mechanical and subject to wear, contamination of contact surfaces, etc. The optical instruments are susceptible to errors resulting from changes in the transmission characteristic of a light path between the light source and photoelectric cell.

All of the previously described sensors, with the exception of those employing flux gates, suffer null errors in rough seas because the compass card has a movement in other planes besides the azimuthal or horizontal plane. Further, as the output signal under these conditions includes components proportional to the velocity and acceleration of the vessel in planes other than the azimuthal, it cannot be depended upon to obtain an indication of the rate of movement of the vessel in the azimuthal plane. As is well known, the introduction of a rate signal into an autopilot system is important for proper operation without excessive "huntint" or oscillation around a desired course direction. Because a rate signal cannot be obtained from the sensor output, a separate sensor, usually a gyrocompass or ratee sensitive gyro, must be added. The cost of a gyrocompass frequently exceeds the cost of the marine autopilot system. Therefore, other, more complicated provisions to avoid hunting are used.

The flux gate sensors, although not susceptible to errors of null arising from the movement of the vessel in planes other than the azimuthal, also cannot be used to obtain a rate signal, primarily because of hysteresis effects in the pickup unit.

These difficulties have led experimentors to search for other sensors. As detailed in a paper entitled "The Hall-effect compass" by Ross et al., Journal of Scientific Instruments, Vol. 34, pp. 479–484, Dec. 1957, the ability of a Hall-effect crystal to provide an output signal proportional to the relative orientation of the crystal and the earth's magnetic field has been known for some time.

With reference now to FIG. 1, a Hall-effect device 80 comprises a substantially rectangular block of crystalline material which is oriented with its faces parallel to arbitrary X, Y and Z axes. The crystal has dimensions $X_c$, $Y_c$ and $Z_c$ and is provided with end electrodes 81, 82 which are coupled to a source of current $I_x$, not shown. The upper and lower faces, respectively, of the crystal are also provided with electrodes 83, 84 which function as output terminals. If a magnetic field having an intensity $H_h$ is applied to the device 80 at an angle $\theta$ with respect to the X-Z plane, an output voltage $V_z$ across the terminals 83, 84 may be described as follows:

$$V_z = \frac{10^{-8} R I_x}{y} - H_n \sin\theta$$

where, R = the Hall constant of the material $y$ = block thickness, $I_x$ = current on $x$ axis, $H_h$ = strength of magnetic field.

The Hall-effect device has many advantages. For example, a properly mounted Hall-effect device in a direction sensor can eliminate null errors due to movement of the compass card in planes other than azimuthal. In addition, the Hall-effect device can provide an output signal which is directly proportional to the sine of angular deviation $\theta$ from null. Therefore, the output signals can be differentiated to obtain a rate signal for use in autopilot systems. Also, the Hall-effect device has a sharply defined null plane which may be used for automatic direction control. With particular reference to FIG. 1, the null plane is the X-Z plane where the angle $\theta$ equals zero and the voltage $V_z$ is zero.

Prior systems using Hall-effect devices have not found widespread acceptance. First, the crystals used have large temperature coefficients so that temperature errors are a problem im marine applications. This problem can be overcome by the use of indium arsenide crystals which provide a compromise between the requirement for high electron mobility, and thus a relatively high value of output voltage $V_z$, and a relatively low temperature coefficient. In the present state of art, indium arsenide material provides electron mobility ranging from 12,000 cm²/v/sec to 20,000 cm²/v/sec.

Second, even with use of indium arsenide crystals, the output voltage is very low. Typically, an indium arsenide crystal will produce about 0.25 millivolts per kilogauss of magnetic field intensity when the magnetic field is parallel to the magnetic axis of the crystal, that is to reference line 85 in FIG. 1. Since the earth's magnetic field has an intensity slightly less than one gauss, the amplification required for a Hall-effect device to produce a significant and useful voltage when excited only by the earth's magnetic field is so large that the signal-to-noise ratio becomes a limiting parameter.

The prior art has attempted to increase the voltage output of Hall-effect devices by using devices known as flux concentrators which increase the useable output voltage by a factor of approximately $10^3$. Generally, a flux concentrator comprises rods of high permeability material, such as that known by the trademarks "MU-METAL" or "PERMALLOY C" which are placed on either side of the X-Z faces of the crystal. The rods are separated therefrom by a predefined air gap and extend in a direction parallel to the magnetic axis 85.

However, the concentrator material introduces hysteresis errors when the orientation of the earth's magnetic field with respect to the concentrators is varied so that the rods become saturated. Typically, a shift in the null position will be in the order of 0.5°. Since the concentrator materials are "active" magnetically, they also react with the applied magnetic field so as to form a combined field which is shifted somewhat from the earth's magnetic field. A third problem with Hall-effect devices has been their sensitivity to radio frequency interference, particularly in view of the high amplification required and their use of AC excitation.

Another problem of marine autopilot systems, not necessarily limited to those employing a Hall-effect device, has been the inability to control fast rudder movements which are needed in following seas and in cases where the vessel must be maneuvered rapidly. Present day steering systems allow rudder rates as high as 20° per second. When the vessel is being run on autopilot, however, normal delays may cause over-travel of the rudder past its null or dead-band position. In many closed servo loops used in autopilot systems, "hunting" or continued oscillation of the rudder is encountered when high rates of rudder change are desired.

Some of the prior schemes for controlling hunting have included mechanical and dynamic braking of the rudder's servomotor, feedback from the servomotor to shift the null position, discharge of a condenser to reverse the motor for stopping purposes, and a widening of the dead-band or null. The first three of these approaches require elaborate control mechanisms for the servomotor, and the latter results in an undesirable loss of sensitivity at the null position. Other autopilot systems have limited the rate of rudder change when the vessel is being maneuvered under autopilot control. This approach limits the usefulness of the autopilot. In addition, it involves the use of expensive switching circuitry for electro-mechanical control systems, or the use of flow-control valves with electrically-switched bypasses for electro-hydraulic control systems. In the latter situation, an expensive two-speed servomotor is installed, with a slower speed being used for autopilot control, and a higher speed being used for manual control.

It is therefore an object of this invention to provide a magnetic direction sensor utilizing a Hall-effect device which does not require the use of a magnetically-permeable flux concentrator for the measurement of the angular deviation of a small magnetic field from a reference.

It is a further object of this invention to provide such a magnetic direction sensor which can be used as the directional compass of a ship or other moving body.

It is yet a further object of this invention to provide such a magnetic direction sensor which can be used to provide an output potential proportional to the sine of the angular rotation of a control surface or rudder of a ship or other moving body.

It is another object of this invention to provide such a magnetic direction sensor utilizing a Hall-effect device which is not sensitive to radio frequency interference.

It is yet another object of this invention to provide a combination of such a magnetic direction sensor utilizing a Hall-effect device with an autopilot system for marine vessels or the like, which system includes provisions for class I and class II servocontrol without the need for additional means for sensing the rate of rotation of the sensed magnetic field with respect to a reference.

It is still another object of this invention to provide an autopilot system wherein the steering engine is prevented from reaching a condition of instability resulting in continued oscillation or "hunting" when high rates of rudder positioning are required.

SUMMARY OF THE INVENTION

These objects and others are achieved briefly, in one embodiment of the invention, by making the Hall-effect device responsive to the angular rotation of a separate permanent magnet whose position in turn is controlled by a magnetic field or other condition to be measured.

A BRIEF DESCRIPTION OF THE DRAWINGS

The invention can perhaps best be understood by reference to the following portion of the specification, taken in conjunction with the accompanying drawings in which:

FIG. 1 is the pictorial view of a typical Hall-effect device previously referred to;

FIG. 2 is a separated, pictorial view of a magnetic compass having a Hall-effect device constructed according to the teachings of this invention;

FIG. 3 is a sectionn view of the compass in FIG. 2 showing the mounting of the Hall-effect device;

FIG. 4 is a combined schematic and block diagram of a marine autopilot system using the magnetic direction sensor of this invention;

FIG. 5 is a combined schematic and block diagram showing a modification of the system in FIG. 3 to permit its use as a manual, remote steering system; and FIG. 6 is a separated, pictorial view of a manual control device schematically illustrated in FIG. 4 containing a Hall-effect magnetic direction sensor.

DESCRIPTION OF A PREFERRED EMBODIMENT

Figures 1, 5:
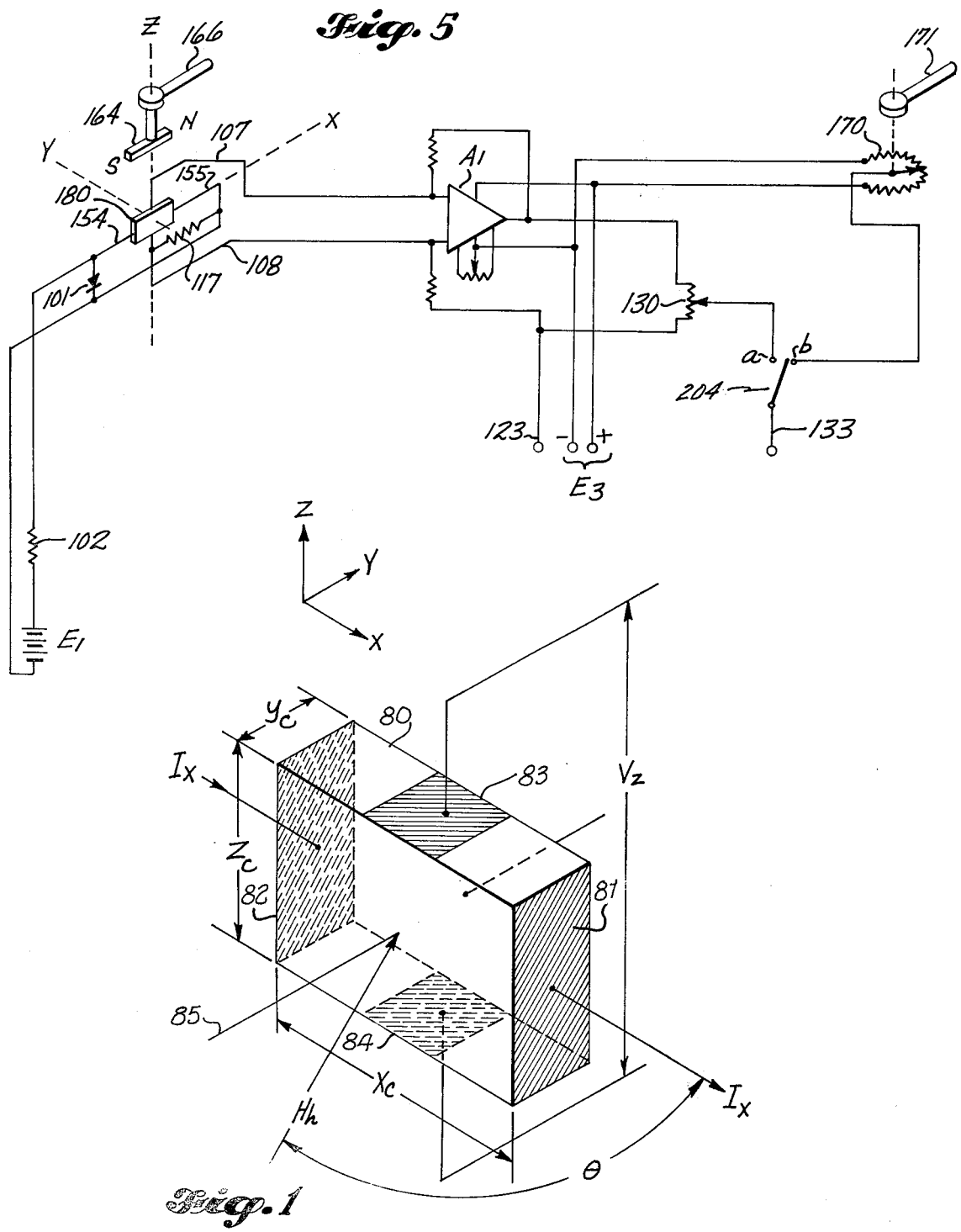

With reference now to FIG. 2, a marine compass employing the magnetic direction sensor of this invention includes a compass bowl 10 having a lower, reduced-diameter portion 11. A printed circuit board 12 including a silicon diode 101 is supported within a cover 16 by fastening means 17, 18, which additionally function to affix cover 16 to reduced-diameter portion 11. Electrical connections are made to printed circuit board 12 by conductors 13, 14, which terminate in a connector 20 and in a cable 22 for electrical connection to the remaining portion of the sensor electronics and to a Hall-effect device.

The interior of compass bowl 10 normally is fluid-filled and includes a support member 24 for a needle pivot 26. A compass card 28 has inscribed thereon both direction and degree indicia and includes a pivot socket, not shown, which rests on pivot 26. A permanent magnet 29 is affixed to card 28 with its magnetic axis coincident with the north-south axis of the card. A small cylinder 30 mounted on the upper surface of card 28 functions as a support for a second pivot socket, not shown.

A compass well 32 has a groove 40 in an upper surface thereof for receiving an O-ring 38. The compass well 32 is secured to the bottom surface of a compass glass 34 by a plurality of fastening means 36. In assembly, compass card 28 is balanced on needle pivot 26 and the small cylinder 30 thereof rides freely in a corresponding aperture, not shown, in compass well 32. A ring 42 maintains compass glass 34 against the upper, flanged surface of compass bowl 10. The compass fluid is maintained within bowl 10 by appropriate sealing means around the edge of compass glass 34 and by O-ring 38.

A slip-ring disk 50, including a plurality 50$_a$, 50$_b$, 50$_c$, 50$_d$, of printed circuit board slip-rings on one surface thereof, rests on the upper surface of compass glass 34 and is rotatable about a cylindrical projection 46 on compass well 32 which extends through corresponding apertures in compass glass 34 and slip-ring disk 50. Electrical connections are made to the plurality of slip-rings 50$_a$, etc., from the cable 22 which passes through a radial notch 34a in glass 34 when in assembly.

A course dial 52 overlays slip-ring disk 50 and also rotates about cylindrical projection 46. Course dial 52 includes a substantially rectangular recess 54 which extends in a direction parallel with the East-West, or 90° – 270°, thereof. A corresponding projection 56a of a brush holder 56 fits into recess 54 when in assembly. Brush holder 56 includes a number of apertures therein for passage of a plurality of brushes 62 which are electrically connected to a printed circuit board, not shown, which is affixed to a carrier member 58. Carrier member 58 includes a central, cylindrical portion 64 which in assembly passes through corresponding apertures in brush holder 56, course dial 52, slip-ring disk 50 and mates with the cylindrical projection 46. As best seen in FIG. 3, a Hall-effect device 80 is mounted on the exterior of cylindrical portion 64 with its X-axis parallel to the North-South, or 0° – 180° axis of the course dial 52. Electrical connections are made to the current electrodes 81, 82, and the voltage output terminals 83, 84 of the Hall-effect device 80 from corresponding terminals on the printed circuit board mounted on carrier member 58. When in assembly, brushes 62 engage corresponding slip-rings 50$_a$, 50$_b$, etc.

The arrangement thus described is maintained in assembly by a washer 68 and a snap-ring 70 which engages a corresponding cylindrical recess 48a in a central pin 48 of compass well 32. Separation between the course dial 52 and compass glass 34 is provided by a compression spring 66.

The assembly is completed by a handle member 60 which covers the upper portion of carrier member 58 and which is secured to brush holder 56 by appropriate fastening means 72, 73.

Both the compass card 28 and the course dial 52 are read by reference to a common lubber line 44 which comprises a cylinder embedded in compass glass 34. When the marine compass is properly mounted on a vessel with the lubber line 44 and compass pivot 26 parallel to the longitudinal axis thereof, and properly compensated for heeling errors, northerly turning errors and errors resulting from adjacent steel or other magnetic elements, relative rotation of the compass card 28 with respect to the lubber line 44 indicates the angular deviation of the vessel's direction from the horizontal component of the earth's magnetic field. If the course dial 52 is first set to a desired heading with reference to lubber line 44, the relative angular deviation $\theta$ of the permanent magnet 29, and thus course dial 28, from the null or X-Z plane of the Hall-effect device 80 is proportional to the angular deviation of the vessel from the heading. As contrasted with the Hall-effect devices of the prior art, the position of the permanent magnet 29 is sensed directly.

With reference now to FIG. 4, the Hall-effect device 80 is supplied with a regulated control current $I_x$ from a DC voltage source $E_1$. The positive output terminal of voltage source $E_1$ is coupled to one current electrode through a resistor 102, a slip-ring and brush combination 103, and a lead 154, and the negative output terminal of voltage source $E_1$ is coupled to the other current terminal through a slip-ring and brush combination 104 and a lead 155. A silicon diode 101 is connected across slip-ring combinations 103 and 104. Silicon diode 101 and resistor 102 regulate the voltage across the current terminals of the Hall-effect device 80 at a predetermined value, for example, 0.7 volts. As a result, the exciting current $I_x$ is substantially constant. If indium arsenide is used as the Hall-effect material, this current will be on the order of 150 milliamps.

Leads 107 and 108 are connected to the voltage output terminals of the Hall-effect device 80. The signals appearing thereon are coupled through slip-ring and brush combinations 109, 110, to the inverting and non-inverting inputs, 115, 116, of an operational amplifier $A_1$. Operational amplifier $A_1$ develops a D.C. voltage on its output terminal 119 whose polarity is dependent on the direction and whose magnitude is dependent on the sine of the angular deviation $\theta$ between the null or X-Z plane of the Hall-effect device 80, and the magnetic axis of compass magnets 29, in a manner to be described hereinafter.

Commercially available, inexpensive Hall-effect devices of indium arsenide have a resistive or "offset" voltage which prevents them from having a zero voltage output $V_z$ when the control current $I_x$ is supplied in the absence of a magnetic field. Therefore, this offset must be compensated for in order to obtain a true null indication. One portion of an offset compensating means comprises a resistor 111 which is connected from lead 155 to lead 108. The polarity of the offset voltage obtained with zero magnetic excitation determines which of the voltage output terminals the resistor 111 is connected to, and the magnitude of this offset voltage determines the value of the resistor 111.

The output signal on terminal 119 of amplifier $A_1$, which is proportional to a constant times the sine of the angular deviation $\theta$, or $(K_1)(\sin\theta)$ is coupled through a pair of capacitors 117, 118, to the non-inverting input of a second operational amplifier $A_2$ identical in type to $A_1$. The combination of capacitors 117, 118 and operational amplifier $A_2$ function to differentiate the signal $(K_1)$ (Sin $\theta$) so that the signal on the output terminal 120 of amplifier $A_2$ is proportional to $$(K_2) \frac{d(\operatorname{Sin}\theta)}{dt}$$

The output signal on terminal 119 is also connected to one side of a potentiometer 130 whose other side is coupled to a reference signal appearing on a lead 123. Similarly, the output signal on terminal 120 of amplifier $A_2$ is connected to one side of a potentiometer 131, whose other side is connected to lead 123. The tap of potentiometer 130 is coupled through a resistor 132 to a lead 133, and the tap of potentiometer 131 is coupled through a resistor 132a to lead 133. Lead 133 is in turn connected to a first input of a variable-threshold, differential amplifier DA. The potentiometer 130 will hereinafter be referred to as a "rudder" control, and the potentiometer 131 will be hereinafter referred to as the "counter rudder" control.

The reference D.C. potential for amplifiers $A_1$ and $A_2$, and for a linear operational amplifier $A_3$ identical in type to $A_1$ to be described, is obtained from a voltage source $E_3$ by a voltage divider network including equal valve resistors 121 and 122. The reference potential appears on lead 123 and is coupled to the non-inverting inputs of amplifiers $A_1$, $A_2$, and $A_3$ by resistors 125a, 125b, and 125c. The terminals of voltage source $E_3$ are likewise connected to each of the operational amplifiers $A_1$, $A_2$, and $A_3$ in a conventional manner.

The internal offset voltage of the amplifier $A_1$, as well as any constant non-compensated offset appearing in the signal from the Hall-effect device 80, is compensated for by a potentiometer 126 whose tap is coupled to the negative terminal of the voltage supply $E_3$ and whose ends are connected to the offset inputs of amplifier $A_1$. Preferably, the output voltage of $A_1$ is adjusted by adjustment of the position of the tap of potentiometer 126 so that the ouput potential on terminal 119 has a magnitude equal to that of the reference potential appearing on lead 123, when there is no magnetic field applied to the Hall-effect device 80, or, when the magnetic axis of the magnet 29 lies in the null or X-Z plane. A second potentiometer 127 is connected in parallel with potentiometer 126 and is mounted in a location convenient to the vessel's operator so as to allow a small change in offset, and thus a small change in course direction, without requiring manipulation of the course dial 52.

The stability of amplifiers $A_1$, $A_2$ and $A_3$ is increased by connecting resistors 124a, 124b, and 124c in a degenerative feedback mode from the output terminals to the inverting inputs thereof.

To this point, the circuitry for obtaining an angular deviation signal $(K_1)$ sin $\theta$ and a rate signal $$(K_2) \frac{d(\operatorname{Sin}\theta)}{dt}$$

has been described. In order to control the correction of the vessel's course to one commanded by the angular deviation and rate signals, a signal must be obtained which is related to the angular deviation of the vessel's rudder from the longitudinal axis of the vessel. To this end, a second Hall-effect device 160 is mounted on the vessel adjacent the rudder or other control surface 162. A permanent magnet 161 is connected to and rotatable with the rudder or control surface 162, and aligned with its magnetic axis coincident with the X-Z plane of the Hall-effect device 160, when rudder or control surface 162 is centered. Control current for the device 160 is provided from a voltage source $E_2$ whose negative terminal is connected thereto by a lead 157 and whose positive terminal is connected thereto by a resistor 106 and a lead 156. The voltage supply also includes a silicon diode 105 having a similiar configuration to diode 101. The voltage output terminals are connected by leads 113, 114 to the inverting and non-inverting inputs, respectively, of the operational amplifier $A_3$.

A resistor 112 compensates for offset in the Hall-effect device 160. Potentiometer 128 provides compensation for offset within amplifier $A_3$ in a manner identical to that provided by potentiometer 126 for amplifier $A_1$. Amplifier $A_3$ is also supplied from the voltage source $E_3$ and includes the stabilizing resistor 124c. Finally, both the non-inverting input of amplifier $A_3$, and the output 129 terminal thereof, are referenced to the reference potential on line 123 by resistors 125c and 129a, respectively.

The signal on terminal 129 compared to reference potential on lead 123 thus represents the sine of the deviation angle of the rudder or control surface 162 from the reference X-Z axis established by Hall-effect device 160 and is coupled to a second input 134 of differential amplifier DA.

A reference for the signals appearing on inputs 133 and 134 of differential amplifier DA is obtained from the negative terminal of a voltage supply $E_4$, as coupled through resistors 145a, 145b. Voltage supply $E_4$ is also connected to the power supply terminals of differential amplifier DA.

Differential amplifier DA is a two-channel amplifier having a variable threshold, to be explained later. When the signal on input 133 thereof is more negative than the signal on input 134 thereof by an amount greater than a null signal supplied to a variable threshold input 144, an output signal is provided on terminal 135. Conversely, if the signal appearing on lead 134 is more negative than the signal appearing on lead 133 by an amount greater than the null signal on line 144, an output signal is provided on terminal 136.

When a signal is provided on terminal 135, a coil 137 of a relay $R_L$ is energized, thereby closing contact sets 139 and 151 thereof. When a signal is provided on terminal 136, the coil 138 of a relay $R_R$ is energized, thereby closing contact sets 142 and 152 thereof.

When contact set 139 of relay $R_L$ is closed, the positive terminal of voltage source $E_4$ is coupled to a field winding 140 of a servomotor S so that a current path is provided through winding 140 and armature 141 thereof to the negative terminal of $E_4$. As the shaft of armature 141 is coupled to the rudder on control surface 162, closure of the contact set 139 results in a clockwise or "right" rotation of the rudder or control surface 162. Similarly, since contact set 142 of relay $R_R$ is connected to a second field winding 143 of servomotor S, closure thereof in response to an output signal on terminal 136 results in a counter-clockwise or "left" rotation of the rudder control surface 162.

The operation of this system will now be described. In the description, it will be initially assumed that a constant positive null signal is provided to the variable threshold input 144 of differential amplifier DA, and that the output terminal 119 of amplifier $A_1$ is connected directly to lead 133.

If the vessel is proceeding on a course set by course dial 52, the magnetic axis of the magnet 29 on the compass card 28 is coincident with the null or X-Z plane of device 80. Therefore, as both the device 80 and the amplifier $A_1$ are nulled, the potential on the output terminal 119 is at the reference level potential of lead 123. Accordingly, as the voltage divider including resistors 132 and 132a, and potentiometer 130 is connected to the reference signal on lead 123, no signal appears on input 133 of differential amplifier DA.

If the rudder or control surface 162 is amidships, so that the magnetic axis of the magnet 161 is parallel to the X-Z plane of Hall-effect device 160, the signal appearing on output terminal 129 of amplifier $A_3$ is likewise at the reference level potential of lead 123. Accordingly, no signal appears at input 134. As a result, differential amplifier DA produces no output signals on either terminals 135 or 136.

If the vessel now deviates from the course set by the course dial 52 and rotates to the right or clockwise, the signal on lead 107 becomes positive with respect to that on lead 108. Accordingly, the signal on lead 115, or the inverting input of operational amplifier $A_1$, likewise becomes positive with respect to that on lead 116, or the non-inverting input thereof. In response, the output signal on terminal 119 becomes negative with respect to the reference signal established on lead 123. At this time, the signal on input 133 becomes negative with respect to the reference signal supplied to input 134 of differential amplifier DA.

When a difference in the magnitude of the negative signal on lead 133 and the signal on lead 134 exceeds the null signal supplied to terminal 144 thereof, an output signal is provided on terminal 135 which energizes coil 137 to close contact sets 139 and 151 of relay $R_L$. The resultant current flow through field winding 140 causes armature 141 to rotate the rudder or control surface 162 in the left rudder direction. When rudder 162 rotates, magnet 161 also rotates. When the magnetic axis of magnet 161 passes out of the null or X-Z plane of Hall-effect device 160, a differential voltage is provided across leads 113 and 114 such that lead 113 is positive with respect to lead 114. As lead 113 is connected to the inverting input of operational amplifier $A_3$, the signal on the output terminal 129 thereof becomes negative with respect to the reference signal established on lead 123. An output signal is present on terminal 135 of differential amplifier DA until the difference between the negative signals supplied to inputs 133 and 134 from the "course sensor" Amplifier $A_1$ and the "rudder sensor" Amplifier $A_3$ is less than the positive null signal supplied to terminal 144 thereof. At this time, the signal ceases on terminal 135, thereby de-energizing relay $R_L$ and terminating the rotation of armature 141 and rudder 162.

Although the rudder 162 has ceased its rotation, the vessel is at this time still responding and rotating in a counterclockwise direction. As a result, the angular deviation between the magnet 29 on compass card 28 and the null or X-Z plane of Hall-effect device 80 is decreasing. Accordingly, the output voltage on terminal 119 of amplifier $A_1$ becomes less negative. In response, the signal on input 133 of the differential amplifier DA becomes positive with respect to the signal on input 134. When the difference exceeds the null signal supplied to terminal 144, a signal is provided on output terminal 136 which in turn energizes coil 138 of relay $R_R$. The resultant closure of the contact sets 142 and 152 provides current through field winding 143 to rotate armature 141, and therefore rudder 162, in a right rudder direction.

As rudder 162 rotates to the right, the angular deviation between the magnetic axis of its magnet 161 and the null plane of Hall-effect device 160 becomes less, thereby reducing the magnitude of the negative signal on the terminal 129 of amplifier $A_3$. When the signal on input 134 of differential amplifier DA is decreased to a point so that the difference between the signals on inputs 133 and 134 is less than the null signal supplied to terminal 144, the output signal is removed from terminal 136 so that relay $R_R$ is de-energized and rotation of the rudder 162 is terminated.

The system operates in a similar manner if the vessel initially deviates to the left of the desired course, with an energization first of relay $R_R$ so as to result in a right rudder rotation, and subsequent energization of relay $R_L$ so as to result in a left rudder rotation. In either case, movement of the rudder or control surface 162 terminates when the vessel is on course. At this time, the rudder or control surface 162 is amidships.

Variations in steering characteristics and speed of vessels require that the angular deviation of the rudder 162 be also varied. Variable in the amount of rudder that is applied is controlled by "rudder" potentiometer 130. When the tap of potentiometer 130 is adjacent the end to which the output terminal 119 of operational amplifier $A_1$ is connected, the signal which is provided to input 133 approaches the magnitude of the signal on lead 119. However, as the tap is brought adjacent the other end of potentiometer 130, the signal supplied to input 133 decreases. In effect, adjustment of potentiometer 130 varies the coefficient $K_1$ of the angle signals $K_1 \sin \theta$. In this manner, the operator is also able to vary the coupling ratio between the "course sensor" amplifier $A_1$ and the "rudder sensor" amplifier $A_3$, as the magnitude of the signal presented to input 134 is not affected by manipulation of the "rudder" potentiometer 130.

To this point, the invention has been described on the assumption that the signal on input 133 is proportional to the signal appearing on terminal 119 of amplifier $A_1$. In such a system, commonly known as a class 1 servo system, control of the rudder 162 is in direct response to the angular deviation of the ship from its desired course. As described in more detail in a paper entitled "Directional Stability of Automatically Steered Bodies", by Minorsky, 1922, reprinted in "Process Control", Mariott, 1964, page 280, a class 1 servo system, or "follow-up" control, is disadvantageous in that oscillation or hunting occurs about the null position or desired course direction. The addition of a rate signal in control is an essential condition to obtaining a stable autopilot system, or class 2 servo system. This rate signal $$(K_1) \frac{d (\sin \theta)}{dt}$$

as previously mentioned, is provided at the output terminal 120 of the operational amplifier $A_2$.

Assuming now that the output signal on the terminal 119 is increasing in a negative direction, the signal on output terminal 120 is also negative. Since these signals are summed by resistors 132 and 132a, their negative voltage applied to input 133 of differential amplifier DA is more negative than would be the case were only the signal on terminal 119 used. On the other hand, if the signal on terminal 119 is negative but decreasing, the potential on the output terminal 120 of operational amplifier $A_2$ is positive. As a result, the potential applied to input 133 is less negative than would be the case were potential to be coupled directly from output terminal 119.

In effect, when the vessel is swinging away from the desired course, the rate signal $$(K_2) \frac{d(Sin\theta)}{dt}$$

on the output terminal 120 is additive to the angle signal $(K_1) Sin \theta$ present on terminal 119 and tends to produce an additional amount of rudder rotation or correction. On the other hand, when the vessel is swinging towards the desired course, the rate signal $$(K_2) \frac{d(Sin\theta)}{dt}$$

is subtractive and tends to bring the rudder amidships before the vessel has reached the desired course. The "counter-rudder" potentiometer 131 allows the operator to select the amount of rate signal that will be combined with the angle signal from "rudder" potentiometer 130. By appropriate adjustment of the "rudder" and "counter-rudder" potentiometers 130, 131, the operator can adjust the values of the coefficients $K_1$, $K_2$, and thus vary the response of the control system to the prevalent condition of the seas.

To avoid overshoot or hunting as a result of the response characteristics of the servomotor S, the invention includes a null damper circuit which is adjustable to provide a variable null signal to the variable threshold input 144 of differential amplifier DA. The positive terminal of the voltage source $E_4$ is coupled to the input of the null damper circuit through either contact set 151 of relay $R_L$ or contact set 152 of relay $R_R$. The input comprises one end of a variable resistor 147 whose other end is connected through a diode 153 and a parallel-connected resistor 149 and capacitor 148 to terminal 144. A potentiometer 146 is connected across a voltage source $E_5$ and has its tap directly connected to the terminal 144 and one end connected to terminal 144 by a capacitor 150.

The combination of pulse of the null damper circuit, the variable-threshold differential amplifier DA, and the relays $R_L$ and $R_R$ functions to pulse modulate the signals applied to field windings 140 and 143 of the servomotor S when the vessel's angular deviation requires only small movements of the rudder 162. On the other hand, when relatively large movements of the rudder 162 are required, no pulse modulation is made.

In operation, let it be assumed that a small negative potential has been provided on either output terminal 135 or 136 of differential amplifier DA. The consequent closure of contact sets 151 or 152 applies a positive charging potential through variable resistor 147, diode 153 and capacitor 148 to capacitor 150. The normal null or "dead-band" is determined by the magnitude of the positive potential present on terminal 144. This null signal is normally supplied from the tap of potentiometer 146. As a result of the charging of capacitor 150, the positive voltage on terminal 144 is increased. If the difference between the potentials on inputs 133 and 134 is small, the increased null signal on terminal 144 resulting from the charging of the capacitor 150 causes the output signal to be removed from terminal 135 or 136. Accordingly, servomotor S is de-energized. Resistor 149 provides a discharge path for capacitor 148.

Potentiometer 146 provides a discharge path for the positive voltage on terminal 144 to the negative terminal of the potential source $E_5$. Therefore, the potential on terminal 144 now decreases. When the potential on terminal 144 is less than the difference between the potential on inputs 133 and 134, a signal is again provided on either terminal 135 or 136 to re-actuate relay $R_L$ or $R_R$ and thus to apply power to the servomotor S.

The setting of variable resistor 147 determines when the pulse modulation begins, and also determines the duration of each pulse. The null damper circuit has effect only when the difference between the potentials at inputs 133 and 134 is small. In this situation the cycle described above is repeated until the null position is reached. When the difference between the potentials at inputs 133 and 134 is large, however, the null damper circuit has no effect.

By adjustment of potentiometer 146, the system may be compensated for the over-steering characteristics of any particular servomotor. As a result, the servomotor need not be modified to limit its speed of rotation during autopilot operation. With a system configured as in FIG. 4, rudder rotation rates of 30° per second have been achieved with a positioning error of plus or minus 1° from the desired rudder position.

With reference now to FIG. 5, a modification of the system in FIG. 3 for use as a remote steering system includes a Hall-effect device 180 which preferably is mounted in a fixed position. Hall-effect device 180 is provided with appropriate control current from a source including the voltage supply $E_1$, and resistor 102, diode 101, offset resistor 117, and leads 154 and 155. These components are identical to those shown in FIG. 4. A permanent magnet 164 is attached to a lever 166 which is rotatable about the Z axis of the Hall-effect device 180. In response to angular deviation between the magnetic axis of permanent magnet 164 and the null or X-Z plane of Hall-effect device 180, an output voltage is provided across leads 107 and 108 which are coupled to amplifier $A_1$. In response, amplifier $A_1$, which is also supplied with an appropriate reference signal from lead 123, provides an output signal which is coupled to a potentiometer 130. The signal appearing on the tap of potentiometer 130 thus corresponds to the actual angular deviation and is coupled to lead 133 through a contact a of a switch 204. The remainder of the system is identical to that seen in FIG. 4. A comparison of the angle signal present on input 133 with the rudder signal present on input 134 of differential amplifier DA results in a rotation of the rudder, through appropriate energization of the servomotor S, so that the rudder assumes the same angular deviation with respect to the X-Z axis of its Hall-effect device as does the permanent magnet 164 with respect to the X-Z axis of Hall-effect device 180.

The system of FIG. 5 also permits control from a source not including a Hall-effect device. For example, an angle signal may be provided from a potentiometer 170 which is supplied from the voltage source $E_3$ and which furnishes an output signal on its tap proportional to the relative angular position of a control lever 171. If desired, the signals present on the taps of potentiometers 130 and 170 may be used alternatively by supplying them to stationary contacts *a*, *b*, of switching means 204 whose movable contact is connected to input 133.

A practical embodiment of a manual control device is seen in FIG. 6. The Hall-effect device 180 is mounted on one side of a printed circuit board 172 which is rigidly supported in notches of a raised, hollow portion 174 of a base support unit 176. Appropriate electrical connections may be made from the contact points on the printed circuit board 172 to a cable for coupling excitation and output signals to and from the Hall-effect device 180. A carrier member 182 has an interior, hollowed out portion, not shown, which allows carrier member 182 to be slipped over raised portion 174 in assembly and to be relatively rotatable therewith. Carrier member 182 includes an aperture for receiving the permanent magnet 164, a raised, bearing portion 184 and a cylindrical shaft 186. In assembly, the combination of base portion 176 and carrier member 182 is inserted into a cylindrical housing member 190 so that bearing surface 184 passes through a corresponding aperture in an upper face thereof. The assembly is maintained by appropriate fastening means, not shown.

The assembly is positioned on the underside of a housing 192 so that the bearing portion 184 and cylindrical shaft 196 project through a corresponding aperture therein. A bearing member having a flanged portion 196 rests in a recess 194 of housing 192 so a cylindrical bearing portion 196 slips over bearing portion 184. The assembly is secured by a plurality of fastening means, not illustrated, passing through corresponding apertures in flanged portion 196, recess 194, and the upper surface of housing member 190. A washer 200 and a snap-ring 202, which fits into a corresponding recess 188 in cylindrical shaft 186, maintain the carrier member 182 out of frictional contact with the corresponding upper surfaces of base member 176. The assembly is completed by a lever holder 168 which has a first aperture receiving the cylindrical shaft 186 and which is secured thereto by a set screw 169. The lever 166 is then threaded into a second aperture of lever holder 168.

Therefore, if housing 192 is kept from rotation, relative rotation of lever 166 results in an angular deviation between the magnetic axis of magnet 164 and the null or X-Z plane of Hall-effect device 180. As a result, an output signal is provided in the manner previously described.

It will be appreciated that the concept of sensing angular devition by making the Hall-effect device sensitive to the rotation of a small permanent magnet in proximity thereto can be applied to many applications in addition to those involved with marine autopilot systems. For example, the apparatus in FIG. 6 might find application as a continuously rotatable, brushless potentiometer, with either DC or AC excitation. If a second Hall-effect device were added and its null plane rotated from the null plane of Hall-effect device 180 by 90°, the apparatus could be used as a sine-cosine potentiometer. Therefore, it is to be clearly understood by those skilled in the art that the invention is not limited to the specific embodiments shown, but rather is intended to be bound only by the limits of the appended claims.

What is claimed is:

1. A marine autopilot system for automatically controlling the course of a vessel, said system including a marine compass having a reference line aligned with the longitudinal axis of the vessel, a compass card within said marine compass including a first permanent magnet producing a magnetic field, said compass card being relatively rotatable with respect to said reference line in response to deviation thereof from the horizontal component of the earth's magnetic field, a course dial within said marine compass rotatable with respect to said reference line for presetting a desired course, a first Hall-effect device mounted on said course dial and in proximity to said first permanent magnet, a source of DC constant current connected to said first Hall-effect device for establishing a null plane, said first Hall-effect device providing an output signal proportional to the sine of any angular deviation between said first permanent magnet's magnetic field and said null plane, a control surface sensor including a second Hall-effect device, means maintaining said second Hall-effect device in fixed relation to the longitudinal axis of the vessel, a second source of DC constant current connected to said second Hall-effect device for establishing a second null plane, a second permanent magnet producing a magnetic field, means supporting said second permanent magnet so as to be rotatable with a control surface of said vessel and in proximity to said second Hall-effect device to produce an output signal therefrom proportional to the sine of any angular deviation between said second permanent magnet's magnetic field and said second null plane, first and second operational amplifiers each having an input and an output, means resistively coupling said output signals from said first and second Hall-effect devices to said inputs of said first and second operational amplifiers, respectively, said first and second operational amplifiers amplifying said output signals to provide desired course and rudder angle signals, respectively, on said outputs, a differential amplifier coupled to said first and second operational amplifiers for providing a control signal denoting a desired direction of control surface movement whenever the difference between said desired course and rudder angle signals exceeds a predetermined value, and control means responsive to said control signal for controlling the position of said control surface.

2. An autopilot system as recited in claim 1, further including a differentiator coupled to the output of said first operational amplifier for providing a rate signal therefrom, and means for summing said desired course and rate signals for comparison with said rudder angle signal in said differential amplifier.

3. A control system for providing remote control of a vessel, said system including a desired course sensor providing a desired course signal proportional to deviation between a desired course and a reference, a control surface sensor providing a rudder angle signal proportional to any deviation between said control surface and the longitudinal axis of said vessel, a variable threshold differential amplifier having said desired course and rudder angle signals coupled thereto and providing a control signal when the difference therebetween exceeds the magnitude of a signal supplied to a variable threshold terminal thereof, a control means responsive to said control signal for controlling the position of said control surface, and a null damper circuit connected to feed back said control signal to said variable threshold terminal, said null damper circuit comprising a source of DC voltage, variable resistance means coupling said source to said variable threshold terminals, a second variable resistance means, a resistor and first capacitor connected in parallel with each other and in series with said second variable resistance, the combination thereof coupling said control signal to said variable-threshold terminal, and a second capacitor connected from said variable-threshold terminal to one side of said DC source.

4. A control system as recited in claim 3, further including a differentiator for obtaining a rate signal from said desired course signal, said differentiator comprising an operational amplifier, and a capacitor coupling said desired course signal to the input thereof.

5. A control system as recited in claim 4, further including means combining said rate and desired course signals to form a command signal for comparison with said rudder angle signal in said differential amplifier, said combining means comprising first and second potentiometers having their ends coupled to said rate and desired course signals, and resistance means connecting the taps thereof.

6. A control system as recited in claim 3, wherein said desired course sensor and said control surface sensor provide desired course and rudder angle signals which are proportional to the sine of any angular deviation between said desired course and said reference and between said control surface and said longitudinal axis, respectively.

7. A control system as recited in claim 6, wherein said desired course sensor comprises a Hall-effect device.

8. A control system as recited in claim 6, wherein said control surface sensor comprises a Hall-effect device.

9. A control system as recited in claim 6, wherein said desired course sensor and said control surface sensor each comprises a Hall-effect device.

10. A control system as recited in claim 6, wherein said reference comprises the earth's magnetic field and wherein said desired course sensor comprises:
   a. a compass card;
   b. a housing including first means supporting said compass card for relative rotation therewith;
   c. a permanent magnet producing a magnetic field;
   d. a Hall-effect device comprising an essentially planar wafer of material exhibiting the Hall-effect, and having first and second pairs of opposing edge surfaces, a pair of current terminals on said first pair of opposing edge surfaces and a pair of voltage terminals on said second pair of opposing edge surfaces, said pair of current terminals and said pair of voltage terminals thereby defining a null plane;
   e. a course dial which is relatively rotatable with said housing, said Hall-effect device being affixed to said course dial;
   f. a source of constant DC current coupled to said pair of current terminals;
   g. means for coupling one of said pair of current terminals to one of said pair of voltage terminals to provide equal voltage drops between said one current terminal and each of said pair of voltage terminals when no magnetic field is present;
   h. a linear operational amplifier of the integrated circuit type having a pair of first inputs consisting of an inverting and a non-inverting input, a pair of second inputs for supply voltage, a pair of third inputs for offset compensation and an output;
   i. means coupling said first inputs to said pair of voltage terminals;
   j. a source of a DC supply voltage having first and second terminals;
   k. means coupling said first and second terminals to said second inputs;
   l. a source of DC reference potential;
   m. means coupling said DC reference potential to one of said first inputs; and
   n. adjustable resistive means connecting one of said second inputs to both of said third inputs to allow adjustment of the potential appearing on said output to equal said reference potential when said null plane and said permanent magnet's magnetic field are aligned.

11. A control system as recited in claim 10, wherein said material of said Hall-effect device is indium arsenide.

12. A control system as recited in claim 11, wherein said source of constant current maintains the current through said Hull-effect device at approximately 150 milliamps.

13. A control system as recited in claim 10, wherein said material of said Hall-effect device provides an electronic mobility in excess of 12,000 cm$^2$/V/sec.

14. A control system as recited in claim 10, wherein said pair of current terminals and said pair of voltage terminals are positioned on said Hal-effect device such that a line drawn between said pair of current terminals intersects a line drawn between said pair of voltage terminals at essentially a right angle.

15. A control system as recited in claim 10, wherein said source of constant DC current comprises a DC voltage source having positive and negative terminals, resistive means coupling one of said positive and negative terminals to one of said pair of current terminals of said Hall-effect device, means connecting the other of said positive and negative terminals to the other of said pair of current terminals, and a silicon diode connected across said current terminals and in close proximity to said current terminals, said silicon diode being biased in the forward direction by said DC voltage source.

16. A control system as recited in claim 10, wherein said means for coupling one of said pair of current terminals to one of said pair of voltage terminals comprises a resistor.

17. A control system as recited in claim 10, wherein said DC reference potential has a magnitude midway between the magnitudes of the potentials on said first and second terminals of said source of said DC supply voltage.

18. A control system as recited in claim 10, wherein said control surface sensor comprises:
   a. a second Hall-effect device comprising an essentially planar wafer of material exhibiting the Hall-effect, and having first and second pairs of opposing edge surfaces, a pair of current terminals on said first pair of opposing edge surfaces and a pair of voltage terminals on said second pair of opposing edge surfaces, said pair of current terminals and said pair of voltage terminals thereby defining a second null plane;

b. a second permanent magnet producing a magnetic field;

c. a housing including means supporting said second Hall-effect device so that said second null plane is aligned with the longitudinal axis of the vessel;

d. said housing further including shaft means rotatably journaled therein for receiving said permanent magnet;

e. means coupling said control surface to said shaft means;

f. means for coupling said source of constant DC current to said pair of current terminals of said second Hall-effect device;

g. means for coupling one of said pair of said current terminals of said second Hall-effect device to one of said pair of voltage terminals thereof to provide equal voltage drops between said one current terminal and each of said pair of voltage terminals of said second Hall-effect device when no magnetic field is present;

h. a second linear operational amplifier of the integrated circuit type having a pair of first inputs consisting of an inverting and a non-inverting input, a pair of second inputs for supply voltage, a pair of third inputs for offset compensation, and an output;

i. means coupling said first inputs of said second linear operational amplifier to said pair of voltage terminals of said second Hall-effect device;

j. means coupling said second inputs of said second linear operational amplifier to said first and second terminals of said source of DC supply voltage;

k. means coupling said DC reference potential to one of said first inputs of said second linear operational amplifier; and l. a second adjustable resistive means connecting one of said second inputs to both of said third inputs of said second linear operational amplifier to allow adjustment of the potential appearing on said output of said second linear operational amplifier to equal said reference potential when said second null plane and said second permanent magnet's magnetic field are aligned.

19. A control system as recited in claim 10, further including a differentiator for obtaining a rate signal from said desired course signal, said differentiator comprising an operational amplifier, and a capacitor coupling said desired course signal to the input thereof.

20. A control system as recited in claim 19, further including means combining said rate and desired course signals to form a command signal for comparison with said rudder angle signal in said differential amplifier, said combining means comprising first and second potentiometers having their ends coupled to said rate and desired source signals, and resistive means connecting the taps thereof.

21. A control system as recited in claim 20, wherein said operational amplifier comprises a second linear operational amplifier of the integrated circuit type having a pair of first inputs consisting of an inverting and a non-inverting input, a pair of second inputs for supply voltage, and an output, and wherein said capacitor couples the output of said linear operational amplifier in said desired course sensor to one of said first inputs of said second linear operational amplifier, and further comprising a. resistive means coupling the output of said second linear operational amplifier to the other of said first inputs thereof;

b. means comprising said second inputs of said second linear operational amplifier to said first and second terminals of said source DC supply voltage; and c. means coupling said DC reference potential to one of said first inputs of said second linear operational amplifier.

22. A marine autopilot system for automatically controlling the course of a vessel, said system including a marine compass having a reference line aligned with the longitudinal axis of the vessel, a compass card within said marine compass including a first permanent magnet producing a magnetic field, said compass card being relatively rotatable with respect to said reference line in response to deviation thereof from the horizontal component of the earth's magnetic field, a course dial within said marine compass rotatable with respect to said reference line for presetting a desired course, a first Hall-effect device mounted on said course dial and in proximity to said first permanent magnet, a source of DC constant circuit connected to said first Hall-effect device for establishing a null plane, said first Hall-effect device providing an output signal proportional to the sine of any angular deviation between said first permanent magnet's magnetic field and said null plane, a control surface sensor including a second Hall-effect device, means maintaining said second Hall-effect device in fixed relation to the longitudinal axis of the vessel, a second source DC constant current connected to said second Hall-effect device for establishing a second permanent magnet producing a magnetic field, means supporting said second permanent magnet so as to be rotatable with a control surface of said vessel and in proximity to said second Hall-effect device to produce an output signal therefrom proportional to the sine of any angular deviation between said second permanent magnet's magnetic field and said second null plane, first and second operational amplifiers each having an input and an output, means resistively coupling said output signals from said first and second Hall-effect devices to said inputs of said first and second operational amplifiers, respectively, said first and second operational amplifiers amplifying said output signals to provide desired course and rudder angle signals, respectively, on said outputs, a differential amplifier coupled to said first and second operational amplifiers for providing a control signal denoting a desired direction of control surface movement whenever the difference between said desired course and rudder angle signals exceeds a predetermined value, and control means responsive to said control signal for controlling the position of said control surface, wherein said first and second Hall-effect devices each comprise an essentially planar wafer of material exhibiting the Hall-effect, and each having first and second pairs of opposing edge surfaces, a pair of current terminals on said first pair of opposing edge surfaces and a pair of voltage terminals on said second pair of opposing edge surfaces, each said pair of current terminals and said pair of voltage terminals thereby defining said null planes, and further comprising a. means coupling said first and said second sources of DC constant current to said current terminals of said first and said second Hull-effect devices respectively;

b. means coupling one of said pair of current terminals to one of said pair of voltage terminals on each of said first and second Hall-effect devices to provide equal voltage drops between each said one current terminal and each of said pair of voltage terminals when no magnetic field is present;

c. said first and second operational amplifiers each being of the linear, integrated circuit type and each having a pair of first inputs consisting of an inverting and a non-inverting input, a pair of second inputs for supply voltage, a pair of third inputs for offset compensation, and an output;

d. said means resistively coupling said output signals from said first and second Hall-effect devices to said inputs of said first and second operational amplifiers comprise means coupling said first inputs of said first and second linear operational amplifiers to said pairs of voltage terminals of said first and second Hall-effect devices, respectively;

e. a source of a DC supply voltage having first and second terminals;

f. means coupling said first and second terminals to said second inputs of said first and second linear operational amplifiers;

g. a source of DC reference potential;

h. means coupling said DC reference potential to one of said first inputs of each said first and second linear operational amplifiers; and i. first and second adjustable resistive means each connecting one of said second inputs to both of said third inputs of each said first and second linear operational amplifiers to allow adjustment of the potential appearing on each said output thereof to equal said reference potential when said first null plane and said first permanent magnet's magnetic field, and when said second null plane and said second permanent magnet's magnetic field are aligned, respectively.

23. An autopilot system as recited in claim 22, further including a differentiator coupled to the output of said first linear operational amplifier for providing a rate signal therefrom, said differentiator including a. a third linear operational amplifier of the integrated circuit type having a pair of first inputs consisting of an inverting and a non-inverting input, a pair of second inputs for supply voltage, and an output;

b. a capacitor coupling the output of said first linear operational amplifier to one of said first inputs of said third linear operational amplifier;

c. resistive means coupling the output of said third linear operational amplifier to the other one of said first inputs thereof;

d. means coupling said first and second terminals of said source of DC supply voltage to said second inputs of said third linear operational amplifier;

e. means coupling said DC reference potential to one of said first inputs of said third linear operational amplifier; and f. means coupled to the outputs of said first and third linear operational amplifiers for summing said desired course and rate signals for comparison with said rudder angle signal in said differential amplifier.

24. A marine autopilot system for automatically controlling the course of a vessel, said system including a marine compass having a reference line aligned with the longitudinal axis of the vessel, a compass card within said marine compass including a permanent magnet producing a magnetic field, said compass card being relatively rotatable with respect to said reference line in response to deviation thereof from the horizontal component of the earth's magnetic field, a course dial within said marine compass rotatable with respect to said reference line for presetting a desired course, a Hall-effect device mounted on said course dial and in proximity to said permanent magnet, a source of DC constant current connected to said Hall-effect device for establishing a null plane, said Hall-effect device providing an output signal proportional to the sine of any angular deviation between said permanent magnet's magnetic field and said null plane, a control surface sensor, means maintaining said control surface sensor in fixed relation to the longitudinal axis of the vessel, said control surface sensor providing an output signal proportional to the sine of any angular deviation between said control surface and said longitudinal axis, first and second operational amplifiers each having an input and an output, means resistively coupling said output signals from said Hall-effect device and said control surface sensor to said inputs of said first and second operational amplifiers, respectively, said first and second operational amplifiers amplifying said output signals to provide desired course and rudder angle signals, respectively, at said outputs, means differentiating said desired course signal to obtain a rate signal, means for summing said desired course signal and said rate signal to obtain a command signal, a differential amplifier coupled to second operational amplifier and to said summing means for providing a control signal noting a desired direction of control surface movement whenever the difference between said command and rudder angle signals exceeds a predetermined value, and control means responsive to said control signal for controlling the position of said control surface.

25. A marine autopilot system for automatically controlling the course of a vessel, said system including a marine compass having a reference line aligned with the longitudinal axis of the vessel, a compass card within said marine compass including a permanent magnet producing a magnetic field, said compass card being relatively rotatable with respect to said reference line in response to deviation thereof from the horizontal component of the earth's magnetic field, a course dial within said marine compass rotatable with respect to said reference line for presetting a desired course, a Hall-effect device mounted on said course dial and in proximity to said permanent magnet, a source of DC constant current connected to said Hall-effect device for establishing a null plane, said Hull-effect device providing an output signal proportional to the sine of any angular deviation between said permanent magnet's magnetic field and said null plane, a control surface sensor, means maintaining said control surface sensor in fixed relation to the longitudinal axis of the vessel, said control surface sensor providing an output signal proportional to the sine of any angular deviation between said control surface and said longitudinal axis, first and second operational amplifiers each having an input and an output, means respectively coupling said output signals from said Hall-effect device and said control surface sensor to said inputs of said first and second operational amplifiers, respectively, said first and second operational amplifiers amplifying said output signals to provide desired course and rudder angle signals, respectively, at said outputs, means differentiating said desired course signal to obtain a rate signal, means for summing said desired course signal and said rate signal to obtain a command signal, a differential amplifier coupled to said second operational amplifier and to said summing means for providing a control signal noting a desired direction of control surface movement whenever the difference between said command and rudder angle signals exceeds a predetermined value, and control means responsive to said control signal for controlling the position of said control surface, wherein said Hall-effect device comprises an essentially planar wafer of material exhibiting the Hall-effect, and having first and second pairs of opposing edge surfaces, a pair of current terminals on said first pair of opposing edge surfaces and a pair of voltage terminals on said second pair of opposing edge surfaces, said pair of current terminals and said pair of voltage terminals thereby defining said null plane, and further comprising:

a. means coupling said source DC constant current to said current terminals;
 b. means coupling one of said pair of current terminals to one of said pair of voltage terminals to provide equal voltage drops between said one current and each of said pair of voltage terminals when no magnetic field is present;
 c. said first and second operational amplifiers each being of the linear, integrated circuit type and each having a pair of first inputs consisting of an inverting and a non-inverting input, a pair of second inputs for supply voltage, a pair of third inputs for offset compensations, and an output;
 d. wherein said means resistively coupling said output signals from said Hall-effect device and said control surface sensor to said inputs of said first and second operational amplifiers comprise means resistively coupling said first inputs of said first and second linear operational amplifiers to said pair of voltage terminals of said Hall-effect device and to said control surface sensor, respectively;
 e. a source of a DC supply voltage having first and second terminals;
 f. means coupling said first and second terminals to said second inputs of said first and second linear operational amplifiers;
 g. a source of DC reference potential;
 h. means coupling said DC refernce potential to one of said first inputs of each said first and second linear operational amplifiers; and,
 i. first and second adjustable resistive means each connecting one of said second inputs to both of said third inputs of each of said first and second linear operational amplifiers to allow adjustment of the potential appearing on each said output thereof to equal said reference potential when said null plane and said permanent magnet's magnetic field are aligned.

26. A marine autopilot system as recited in claim 25, wherein said differentiating means comprises:

a. a third linear operational amplifier of the integrated circuit type having a pair of first inputs consisting of an inverting and a non-inverting input, a pair of second inputs for supply voltage, and an output;
 b. a capacitor the output of said first linear operational amplifier to one of said first inputs of said third linear operational amplifier;
 c. resistive means coupling the output of said third linear operational amplifier to the other one of said first inputs thereof;
 d. means coupling said first and second terminals of said source of DC supply voltage to said second inputs of said third linear operational amplifier; and
 e. means coupling said DC reference potential to one of said first inputs of said third linear operational amplifier.

* * * * *

UNITED STATES PATENT AND TRADEMARK OFFICE
CERTIFICATE OF CORRECTION

PATENT NO. : 3,946,691

DATED : March 30, 1976

INVENTOR(S) : Robert M. Freeman

It is certified that error appears in the above-identified patent and that said Letters Patent are hereby corrected as shown below:

Column 16, line 28 "Hull-effect" should be --Hall-effect--.

Column 16, line 35, "Hal-effect" should be --Hall-effect--.

Column 18, line 67, "Hull-effect" should be --Hall-effect--.

Column 20, line 52, "Hull-effect" should be --Hall-effect--.

Column 22, line 27, after the word capacitor, insert the word --coupling--.

Signed and Sealed this fifteenth Day of June 1976

[SEAL]

Attest:

RUTH C. MASON
Attesting Officer

C. MARSHALL DANN
Commissioner of Patents and Trademarks